United States Patent
Hlawatschek et al.

(10) Patent No.: US 10,125,607 B2
(45) Date of Patent: Nov. 13, 2018

(54) STRIKE CONSTRUCTIONS, PICKS COMPRISING SAME AND METHODS FOR MAKING SAME

(71) Applicant: ELEMENT SIX GMBH, Burghaun (DE)

(72) Inventors: Daniel Hlawatschek, Burghaun (DE); Bernd Heinrich Ries, Burghaun (DE)

(73) Assignee: Element Six GmbH, Burghaun (DE)

( * ) Notice: Subject to any disclaimer, the term of this patent is extended or adjusted under 35 U.S.C. 154(b) by 89 days.

(21) Appl. No.: 15/036,747

(22) PCT Filed: Nov. 19, 2014

(86) PCT No.: PCT/EP2014/075056
§ 371 (c)(1),
(2) Date: May 13, 2016

(87) PCT Pub. No.: WO2015/075090
PCT Pub. Date: May 28, 2015

(65) Prior Publication Data
US 2016/0305241 A1    Oct. 20, 2016

(30) Foreign Application Priority Data
Nov. 20, 2013 (GB) .................................. 1320501.8

(51) Int. Cl.
*E21C 35/183* (2006.01)
*B23K 31/02* (2006.01)
(Continued)

(52) U.S. Cl.
CPC .......... *E21C 35/183* (2013.01); *B23K 31/025* (2013.01); *B24C 1/04* (2013.01);
(Continued)

(58) Field of Classification Search
CPC ........ E21C 35/18; E21C 35/183; E21C 35/19; E21C 35/193; E21C 35/197;
(Continued)

(56) References Cited

U.S. PATENT DOCUMENTS

| 4,872,293 A | 10/1989 | Yasukawa et al. |
| 2005/0088034 A1* | 4/2005 | Clemenson ............ B28D 1/188 |
| | | 299/106 |

(Continued)

FOREIGN PATENT DOCUMENTS

| GB | 2488408 A | 8/2012 |
| GB | 2489589 A | 10/2012 |

(Continued)

OTHER PUBLICATIONS

International Patent Application No. PCT/EP2014/075056, International Search Report and Written Opinion dated Dec. 8, 2015, 15 pages.

*Primary Examiner* — Sunil Singh
(74) *Attorney, Agent, or Firm* — Dean W. Russell; Clark F. Weight; Kilpatrick Townsend & Stockton LLP (57) ABSTRACT

A method of making a strike construction for a pick tool, a strike construction for a pick tool and a pick tool. The strike construction comprises a strike tip (2) and a support body (20), in which respective attachment ends (10,22) of each of the strike tip and support body are joined to each other, the attachment end of the strike tip is coterminous with cemented carbide material comprised in the strike tip, and the attachment end of the support body is coterminous with cemented carbide material comprised in an end portion of the support body, the end portion being configured such that sides of the support body depend divergently from its attachment end. The method includes providing the strike tip (2) and a precursor body (28) for the support body, in which a proximate end (25) of the precursor body is coterminous
(Continued)

with cemented carbide material comprised in an end portion of the precursor body, the end portion of the precursor body being configured such that sides of the precursor body depend divergently from its proximate end, the area of which is less than the area of the attachment end of the support body (20). The method further including processing the end portion of the precursor body to increase the area of the proximate end to that of the attachment end of the support body; and joining the respective attachment ends of the strike tip and the support body to provide the strike construction.

17 Claims, 6 Drawing Sheets

(51) Int. Cl.
  *B24C 1/04* (2006.01)
  *B24C 11/00* (2006.01)
  *E21C 35/18* (2006.01)
(52) U.S. Cl.
  CPC ...... *B24C 11/00* (2013.01); *E21C 2035/1806* (2013.01); *E21C 2035/1813* (2013.01); *E21C 2035/1816* (2013.01)

(58) Field of Classification Search
  CPC ............. E21C 35/1933; E21C 35/1936; E21C 2035/1803; E21C 2035/1806; E21C 2035/1813; E21C 2035/1816; E21C 2035/191
  USPC ........ 299/79.1, 85.2, 100–111, 112 R, 112 T, 299/113
  See application file for complete search history.

(56) References Cited

U.S. PATENT DOCUMENTS

| | | |
|---|---|---|
| 2007/0290545 A1 | 12/2007 | Hall et al. |
| 2008/0169698 A1 | 7/2008 | Hall et al. |
| 2008/0197692 A1 | 8/2008 | Hall et al. |
| 2008/0211290 A1 | 9/2008 | Hall et al. |
| 2008/0284234 A1 | 11/2008 | Hall et al. |
| 2009/0267403 A1 | 10/2009 | Hall et al. |
| 2011/0175430 A1 | 7/2011 | Heiderich et al. |
| 2012/0098326 A1 | 4/2012 | Monyak et al. |

FOREIGN PATENT DOCUMENTS

| | | |
|---|---|---|
| WO | 20080105915 A2 | 9/2008 |
| WO | 2011069637 A1 | 6/2011 |
| WO | 2012130870 A1 | 10/2012 |
| WO | 2014049162 A2 | 4/2014 |

* cited by examiner

STRIKE CONSTRUCTIONS, PICKS COMPRISING SAME AND METHODS FOR MAKING SAME

CROSS REFERENCE TO RELATED APPLICATIONS

This application is the U.S. national phase of International Application No. PCT/EP2014/075056 filed on Nov. 19, 2014, and published in English on May 28, 2015 as International Publication No. WO 2015/075090 A2, which application claims priority to Great Britain Patent Application No. 1320501.8 filed on Nov. 20, 2013, the contents of all of which are incorporated herein by reference.

BACKGROUND

This disclosure relates generally to strike constructions for pick tools, particularly but not exclusively strike constructions comprising super-hard material; to picks comprising same, particularly but not exclusively for pavement milling, soil stabilisation, mining and boring into rock formations such as in oil and gas exploration; as well as to methods for making the strike constructions.

U.S. Pat. No. 7,950,746 discloses an attack tool for degrading materials, comprising a base segment, a first wear-resistant segment bonded to the base segment, and a second wear-resistant segment bonded to the first wear-resistant segment at a brazed joint opposite the base segment. Super-hard material is bonded to an end of the second segment, and both segments comprise hard-metal material such as cemented carbide material. At least a portion of exterior surfaces of both the wear-resistant segments proximate the joint comprises a finish ground surface. A disclosed method of manufacturing the attack tool includes braze joining the first and second segments and grinding a braze-induced affected zone proximate the brazed joint. Excess braze material may extrude to the outside of the brazed joint and brazing may result in an "affected zone", which may be weakened by cracks, depressions, scrapes or other irregularities or imperfections. The affected zone is removed by grinding to a finished surface.

There is a need for super-hard pick tools having sufficiently high working life, and methods for making them efficiently.

BRIEF SUMMARY

Viewed from a first aspect, there is provided a method of making a strike construction for a pick tool, the strike construction comprising:
a strike tip and
a support body, in which
respective attachment ends of each of the strike tip and support body are joined to each other,
the attachment end of the strike tip is coterminous with cemented carbide material comprised in the strike tip, and
the attachment end of the support body is coterminous with cemented carbide material comprised in an end portion of the support body, the end portion being configured such that sides of the support body depend divergently from its attachment end;
the method including:
providing the strike tip and a precursor body for the support body, in which a proximate end of the precursor body is coterminous with cemented carbide material comprised in an end portion of the precursor body, the end portion of the precursor body being configured such that sides of the precursor body depend divergently from its proximate end, the area of which is less than the area of the attachment end of the support body;
processing the end portion of the precursor body to increase the area of the proximate end to that of the attachment end of the support body; and joining the respective attachment ends of the strike tip and the support body to provide the strike construction.

Various versions of methods and combinations of steps for making strike constructions are envisaged by this disclosure, non-limiting and non-exhaustive examples of which are described below.

The attachment and proximate ends of the support body and precursor body, respectively, will be defined by respective end portions, outer side surfaces of which will generally diverge away from the respective end. The end portion of the precursor body may be at least slightly longer than that of the support body, and consequently the area of the proximate end will be less than that of the support body, since the end portions of both the precursor body and the support body will tend to converge towards the proximate and attachment ends, respectively (as used herein, the length of the precursor body is the distance between the respective centres of the proximate and distal ends, along a central longitudinal axis; and similarly, the length of the support body is the distance between the respective centres of its attachment end and an opposite end, lying on a longitudinal axis).

In some example arrangements, at least one of the support body and the precursor body may comprise a frusto-conical end portion, coterminous with the attachment or proximate end, respectively. In some examples, the length of the frusto-conical end portion of the precursor body may be greater than that of the support body. The support body may be provided by grinding or cutting away material from adjacent the proximate end of the precursor body, thus shortening the frusto-conical end portion and increasing the area of the proximate end to the area of the attachment end of the support body.

In some examples, the method may include processing a region of the strike construction adjacent at least one of the attachment ends to modify a physical characteristic of at least a part of the region. Examples of physical characteristics of that may be modified may include surface roughness, a size dimension and or the sharpness or roundedness (for example, as characterised by a radius of an osculating circle) of an edge.

In some examples, the strike construction may include an exposed edge defined by an intersection of an attachment end and a side area adjacent the attachment end, and the method may include processing the exposed edge to form an arcuate edge area. The arcuate edge area will form a continuously curved surface extending from the attachment end to the adjacent side area. The arcuate edge area may define an osculating circle having a radius of at least 0.01 millimeter (mm), at least about 0.1 mm or at least about 0.3 mm (the osculating circle, which is merely a mathematical way of describing the arcuate edge, will lie on a longitudinal plane).

In some examples, the strike tip may comprise super-hard material coterminous with a strike end opposite its attachment end. An example strike tip may comprise polycrystalline diamond (PCD) material, polycrystalline cubic boron nitride (PCBN) material, silicon carbide-bonded diamond (SCD) material or composite material comprising cemented carbide material, in which diamond grains are dispersed.

The strike tip may comprise super-hard material joined to a cemented carbide substrate, in which a base of the substrate defines the attachment end of the strike tip.

In some example arrangements, the strike end may include an apex. For example, at least a part of the strike end may have the shape of a spherically blunt cone. The apex may define a radius of curvature in a longitudinal plane, of at least 2.0 millimeters (mm) or at least 3 mm; and or the radius of curvature may be at most 6 mm or at most 4 mm.

In some example arrangements, the cemented carbide material comprised in the strike tip, such as in a substrate joined to super-hard material, and that comprised in the support body may have certain different physical characteristics, such as different hardness, toughness, resistance to wear, size distribution of metal carbide grains and or content of binder material such as cobalt. In some examples, the support body may comprise cemented carbide material that is substantially harder than the cemented carbide material comprised in a substrate joined to super-hard material.

In some examples, the attachment end of the strike tip may be substantially circular. In some example arrangements, the attachment end of the support body may be substantially circular, elliptical, parabolic or polygonal in shape, or a shape that may have partial characteristics of any of these in combination. The attachment ends may both include a planar area; the entire end of one or both of the attachment ends may be substantially planar.

In some examples, the attachment end of the support body may have a maximum linear dimension between antipodal points of up to about 5 millimeters (mm) greater that the maximum linear dimension between antipodal points of the strike tip. For example, the attachment ends of the support body and strike tip may both be substantially circular, the diameter of the former being up to about 5 mm greater than that of the latter; and or the diameter of the former being at least 0.5 mm greater than that of the latter. In other example arrangements, the attachment end of the support body may be substantially elliptical and have a transverse diameter of up to 5 mm greater than the diameter of the attachment end of the strike tip; and or a transverse diameter at least 0.5 mm greater than the diameter of the attachment end of the strike tip. The transverse and conjugate axes of an ellipse may also be referred to as major and minor axes, respectively (an ellipse being a closed conic section).

In some examples, the proximate end of the precursor body may be substantially circular, having a diameter of at least 0.5 mm less than that of the attachment end of the strike tip. After processing, the attachment end of the resulting support body may be substantially elliptical, having a conjugate diameter that is greater than or equal to the diameter of the attachment end of the strike tip.

In some example arrangements, the support body may comprise a cylindrical shaft and a frusto-conical end portion.

In some examples, the respective attachment ends of the strike tip and the support body may not be concentric as joined. The respective centres of each of the attachment ends may be displaced laterally relative to each other by a displacement distance of 0.5 to about 5 millimeters (mm), the lateral plane being substantially parallel to the attachment end of the strike tip. In some examples, at least one of the attachment ends may extend beyond the edge of the other attachment end, thus exposing an edge of the former. The edge may be formed by an intersection of the former attachment end and a side surface adjacent to it, and the exposed edge may be linear or arcuate, for example, on a lateral plane.

In some examples, the method may include processing the strike construction by means of abrasive jet machining (AJM) using abrasive grains having a Knoop hardness of at least 2,200. For example, the abrasive grains may comprise or consist of silicon carbide (SiC), boron carbide ($B_4C$), cubic boron nitride (cBN) and or natural or synthetic diamond material. The abrasive grains may consist of singe- or polycrystalline material. In various examples, the abrasive grains may have a mean size of at least about 50 microns; and or at most about 500 microns (the grain size being expressed in terms of the equivalent circle diameter, ECD, as measured by laser diffraction means).

Various aspects of the abrasive jet machining may include one or more of the following, alone or in combination with one or more other aspects: the abrasive grains may impact the strike construction at a rate of at least about 50 grams per minute (g/min); the distance between a nozzle of an AJM apparatus, from which the abrasive grains emanate, may be about 5 to about 100 mm; and or the AJM may be applied for a treatment period of at least about 1 minute, and or at most about 20 minutes. In some examples, a region of the strike construction may be rotated through a flux of the abrasive grains (being used in the AJM process) about a longitudinal axis of the strike construction, at a rate of 0.5 to 20 revolutions per minute (rpm), the region passing through the flux of abrasive grains in each revolution; the region may include an area adjacent one or both of the attachment ends. The MM processing may result in at least 0.1 gram, and or at most about 5 grams of cemented carbide material being removed from the strike construction. The AJM processing may result in a roughened cemented carbide side surface of the strike construction in an area adjacent one or both attachment ends, the surface roughness having an arithmetic mean value ($R_a$) of at least 1.00 micron or at least 1.50 microns; and or at most about 3.00 microns or at most 2.00 microns. In some examples, the direction of the abrasive jet (in other words, the flux of the abrasive grains) in relation to the orientation of the strike construction may be controlled by an automated control mechanism, responsive to receiving information (such as optical information) about a condition of the strike construction, such as its orientation and position. In some examples, the flux and energy of the abrasive grains comprised in the abrasive jet may be sufficient to produce visible sparks between the nozzle and the precursor construction.

In some examples, the strike construction may be subjected to AJM while in an atmosphere having a pressure of at most about 80 kilopascals. In some example arrangements, the abrasive jet may be generated by an apparatus capable of expelling a stream of gas or liquid transporting a flux comprising a plurality of the abrasive particles, in which the pressure of the fluid within a chamber of the apparatus may be at least 30 kilopascals (kPa) or at least about 35 kPa higher than that of the atmosphere into which the abrasive grains are injected.

In some examples, abrasive jet machining may be applied to the strike construction after the strike tip has been joined to the support body, and in other examples, AJM may be applied to at least the end portion of the support body prior to joining it to the strike tip.

In some examples, residual material that may be attached to the strike tip may be removed by means of AJM processing. The residual material may comprise molybdenum, zirconium, tantalum, niobium or titanium in elemental, alloy or compound form, and or oxide or carbide ceramic material. The residual material may comprise metal and or ceramic material. The residual material might have become attached to the strike tip during a process in which the strike tip had been produced by sintering. For example, the strike tip may comprise polycrystalline super-hard material joined to a cemented carbide substrate in a process of subjecting precursor material to an ultra-high pressure, high temperature sintering procedure, in which the precursor material might have been encapsulated within a jacket comprising molybdenum, tantalum, niobium or magnesium oxide, for example.

In some examples, the strike tip may be joined to the support body by means of joiner material, such as braze alloy, and in some examples, most or substantially all joiner material that may be attached to a side of the strike construction may be removed by means of AJM processing.

In some examples, the joiner material may comprise braze alloy material and be present in the form of a join layer between the attachment ends of the strike tip and support body, having a have a mean thickness of 10 to 100 microns Viewed from a second aspect, there is provided a strike construction comprising
  a strike tip and
  a support body, in which
    respective attachment ends of each of the strike tip and support body are joined to each other,
    the attachment end of the strike tip is coterminous with cemented carbide material comprised in the strike tip, and
    the attachment end of the support body is coterminous with cemented carbide material comprised in an end portion of the support body, the end portion being configured such that sides of the support body depend divergently from its attachment end; and in which
    the strike tip and support body are substantially non-concentric, the strike construction being substantially free of non-arcuate exposed edges adjacent the attachment ends (in other words, central longitudinal axes of the strike tip and the support body, respectively, are laterally displaced from each other, and any or all exposed edge areas adjacent the attachment ends are arcuate in a longitudinal plane).

Various arrangements and combinations of features are envisaged by this disclosure for strike constructions, non-limiting and non-exhaustive examples of which will arise from the example methods described above, in connection with the first aspect.

As used herein, an arcuate edge is capable of being characterised with reference to a (mathematically notional) osculating circle through points on the arcuate edge. Such an edge will be a smooth, continuously curved region of transition connecting adjacent non-parallel surface areas of a body. The curvature will be evident when the body is viewed in cross section through both surface areas. An arcuate edge area will connect adjacent non-parallel areas of a body and follow a curved path from one of the areas to the other. Similarly as used herein, an arcuate concavity is a smooth concave part of a surface of body and is capable of being characterised with reference to an osculating circle. A non-arcuate edge comprises a region of transition between adjacent non-parallel surface areas of a body that, the region not being continuously curved along a path extending from one of the surface areas to the other, or in which the transition is relatively sharp or abrupt, such that it is not possible to describe the non-arcuate edge with reference to an osculating circle having a radius of more than 0.01 mm, for example. Examples of non-arcuate edges include line edges defined by the intersection of two adjacent and substantially non-parallel surface areas (in which the areas or tangents to the areas are disposed at an included angle of less than about 170 degrees with respect to each other) or point edges defined by the intersection of three surfaces.

In some example arrangements, the strike construction may comprise an arcuate concavity (such as a fillet) in the vicinity of the join between the support body and the strike tip, or including the joint. It may be possible to describe the curved concavity using the mathematical notion of an osculating circle, the radius of which may be at least 0.1 millimeters (mm) or at least 0.3 mm; and or the radius may be up to about 10 mm, 5 mm or 1 mm.

In some example arrangements, it may be possible to describe all edges that may be present adjacent the joined attachment ends in terms of respective osculating circles, each having a respective radius of at least 0.1 millimeter (mm) or at least 0.3 mm. In some example arrangements, the strike construction may be substantially free of exposed non-arcuate edges of either of the attachment end.

In some example arrangements, the strike construction may be substantially free of exposed edges not capable of being characterised by an osculating circle having a radius of at least 0.01 millimeter (mm).

In some example arrangements, the strike tip may comprise super-hard material coterminous with a strike end, opposite its attachment end.

In some example arrangements, the attachment end of the strike tip may be substantially circular. In some example arrangements, the attachment end of the support end may be substantially elliptical or substantially circular.

In some example arrangements, the central longitudinal axes of the strike tip and the support body may be displaced laterally relative to each other by a displacement distance of 0.5 to 5 millimeters (mm). In some example arrangements, an area of at least one of the attachment ends may be exposed.

In some example arrangements, a cemented carbide side area of the strike construction may have an arithmetic mean surface roughness of 1.00 to 3.00 microns adjacent an attachment end.

In some example arrangements, the strike tip and support body may be joined by means of a layer of joiner material having mean thickness of 10 to 100 microns.

In some example arrangements, the strike tip may comprise polycrystalline diamond (PCD) material coterminous with a strike end including an apex opposite the attachment end of the strike tip.

Viewed from a third aspect there is provided a pick tool comprising a strike construction according to this disclosure and a steel holder comprising a shank for attachment to a drive mechanism, in which the strike construction is coupled to the holder.

The support body and the holder may be cooperatively configured such that the support body can be non-moveably coupled with the holder. The support body may be configured for insertion into a bore provided in the steel holder. For example, the support body may be shrink or press fit into a bore provided in the steel holder.

In some examples, the pick tool may be for pavement milling, soil stabilization, trenching, mining or boring into the earth. For example the pick tool may be for milling asphalt or concrete pavement, or for mining coal or potash, or for drilling bores into the earth, as may be carried out for oil or gas exploration or production.

BRIEF DESCRIPTION OF THE DRAWINGS

Non-limiting example arrangements to illustrate the present disclosure are described hereafter with reference to the accompanying drawings, of which.

DETAILED DESCRIPTION OF THE DRAWINGS

Figure 1:
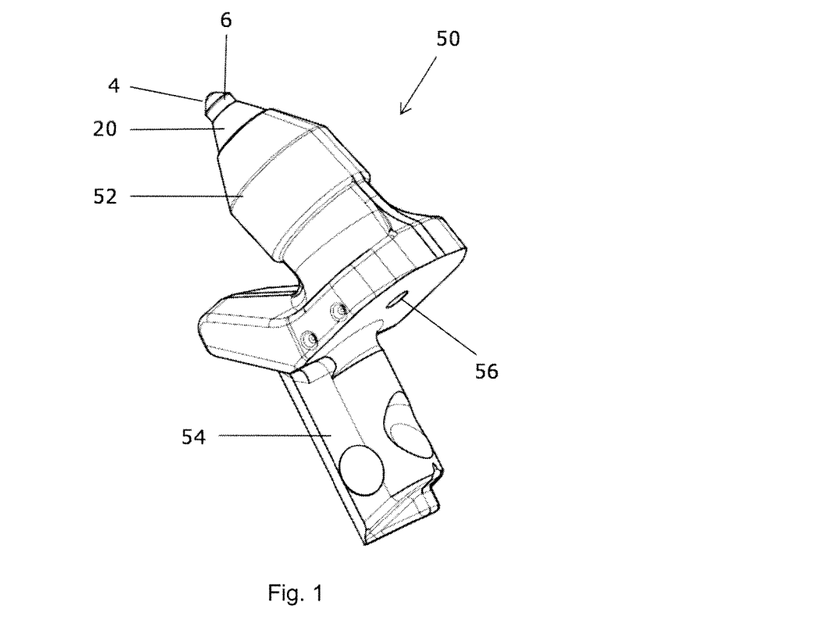
FIG. 1 shows a schematic perspective view of an example pick tool.

With reference to FIG. 1, an example pick tool 50 for a road milling drum (not shown) comprises a strike construction (of which parts 4, 6 and 20 are visible in the drawing) secured to an example steel holder 52 that comprises a shank 54 for coupling to a base (not shown) attached to the drum. In the particular example shown, the holder is provided with a through-hole 56 connecting a base of the holder with the internal volume. The example strike construction comprises a strike tip having a strike end coterminous with super-hard material 4, joined to a cemented carbide substrate 6. An end of the substrate opposite the strike end provides an attachment end joined to a cemented carbide support body 20. In this example, the support body 20 comprises a frusto-conical end portion and a substantially cylindrical volume (not visible in FIG. 1) that is shrink-fitted into a bore provided in the holder 52. In the example shown in FIG. 1, the frusto-conical end portion of the support body 20 can be seen projecting from mouth of the bore.

Figure 2:
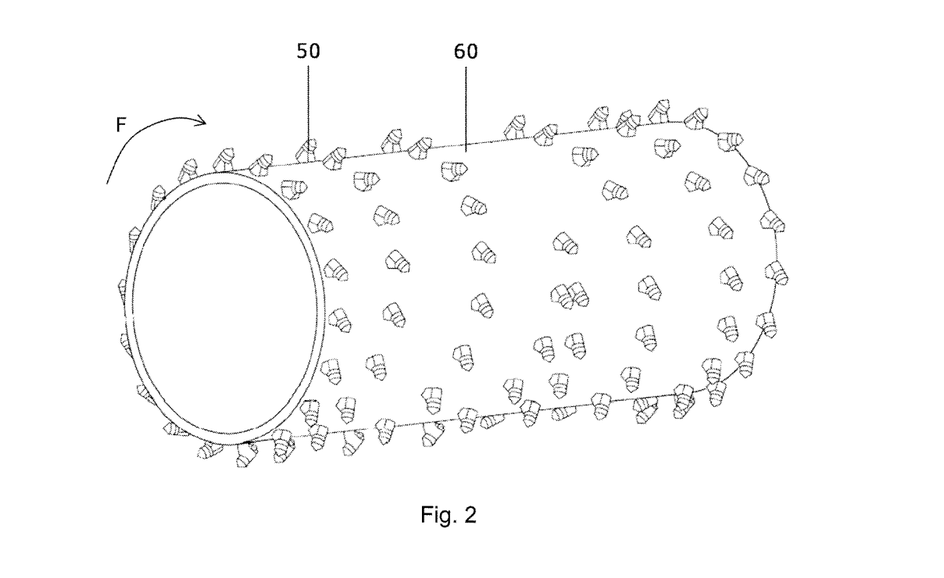
FIG. 2 shows a schematic perspective view of an example drum for road milling, to which is attached example pick tools.

With reference to FIG. 2, an example drum for pavement milling comprises a plurality of example pick tools 50, each coupled to corresponding base bodies welded onto the drum body 60. In use, the drum body 60 will be driven to rotate in the direction F, such that the strike tips of the pick tools 50 can be repeatedly struck into a pavement to be milled (not shown), such as asphalt or concrete. When the pick tools 50 strike the pavement with sufficient force, the pavement will be crushed or fractured and fragments of the pavement will be removed.

Figure 3:
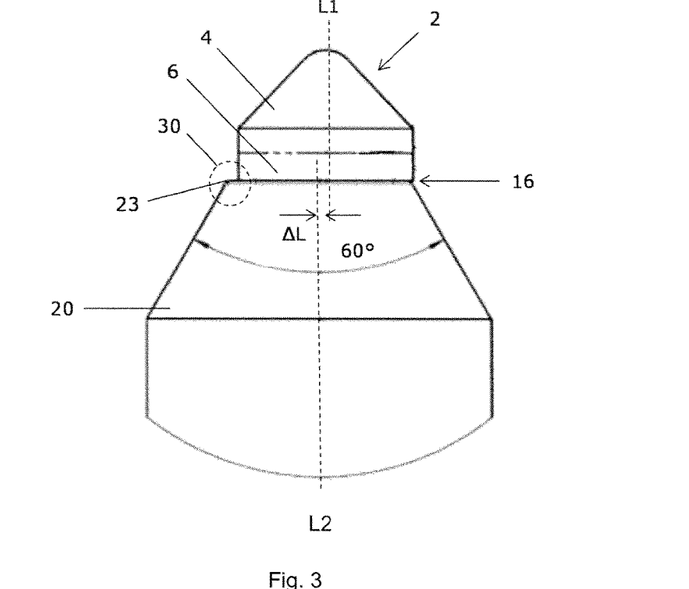
FIG. 3 shows a schematic side view of an end part of an example strike construction.

With reference to FIG. 3, an example strike construction (only an end part of which is illustrated in this drawing) may comprise a strike tip 2 joined to a support body 20, in which respective attachment ends of each of the strike tip 2 and support body 20 may be joined to each other by braze alloy material 16 disposed between them. The strike tip 2 may comprise a super-hard structure 4 joined to a cemented carbide substrate 6, which may provide the attachment end of the strike tip 2 joined to a corresponding attachment end of the support body 20. In this example, the super-hard structure may consist of PCD material, which is coterminous with a strike end opposite the attachment end, the strike end having the shape of a spherically blunted cone, a central longitudinal axis L1 passing through the central apex of the conical shape at the strike end and the centre of its opposite attachment end. The shape of the support body 20 may comprise a cylindrical portion and a frusto-conical end portion that is coterminous with its attachment end. In the particular example illustrated, the side surface of the frusto-conical portion of the support body 20 defines a cone angle of 60 degrees. A central longitudinal (cylindrical) axis L2 passes through the centre of the attachment end of the support body 20. In this example, the longitudinal axes L1, L2 and the centres of the respective attachment ends are not concentric; the attachment ends being laterally displaced relative to each other by a displacement distance ΔL. The area of the attachment end of the support body 20 is greater than that of the strike tip 2 and consequently an edge 23 of the attachment end of the support body 20 is exposed in a region 30 adjacent the attachment end. The exposed edge is arcuate in a longitudinal plane and defines a radius of an osculating circle of about 0.01 mm. The strike construction is substantially free of non-arcuate exposed edges adjacent the attachment ends and the layer 16 of braze material.

Figure 4:
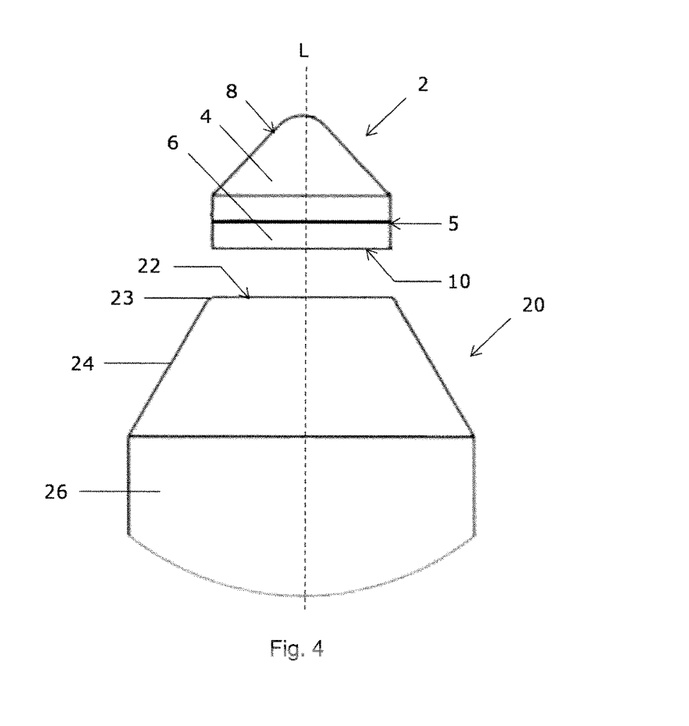
FIG. 4 shows a schematic side view of an example strike tip spaced apart from an example support body, as prior to being joined together.

With reference to FIG. 4, an example method of making an example strike construction (similar to that shown schematically in FIG. 3) may include joining an attachment end 10 of a strike tip 2 to a corresponding attachment end 22 of a support body 20 by means of a braze alloy material (not shown) disposed between the attachment ends 10, 22. The strike tip 2 may consist of a PCD structure 4 joined at an interface boundary 5 to a cemented carbide substrate 6, which provides the attachment end 10 of the strike tip 2. The PCD structure 4 may be coterminous with a strike end 8 opposite the attachment end 10, the strike end 8 having the shape of a spherically blunted cone, a central longitudinal axis L passing through the apex of the cone shape and the centre of the opposite attachment end 10 of the strike tip 2. The support body 20 will have been provided by processing a precursor body to provide the attachment area 22 defined by a frusto-conical end portion 24 of the support body 20, in which the area of the attachment end 22 of the support body 20 may be substantially equal to that of the strike tip 2. In this example, the support body 20 also comprises a cylindrical, rod-like portion 26 adjacent the frusto-conical end portion 24.

Figure 5:
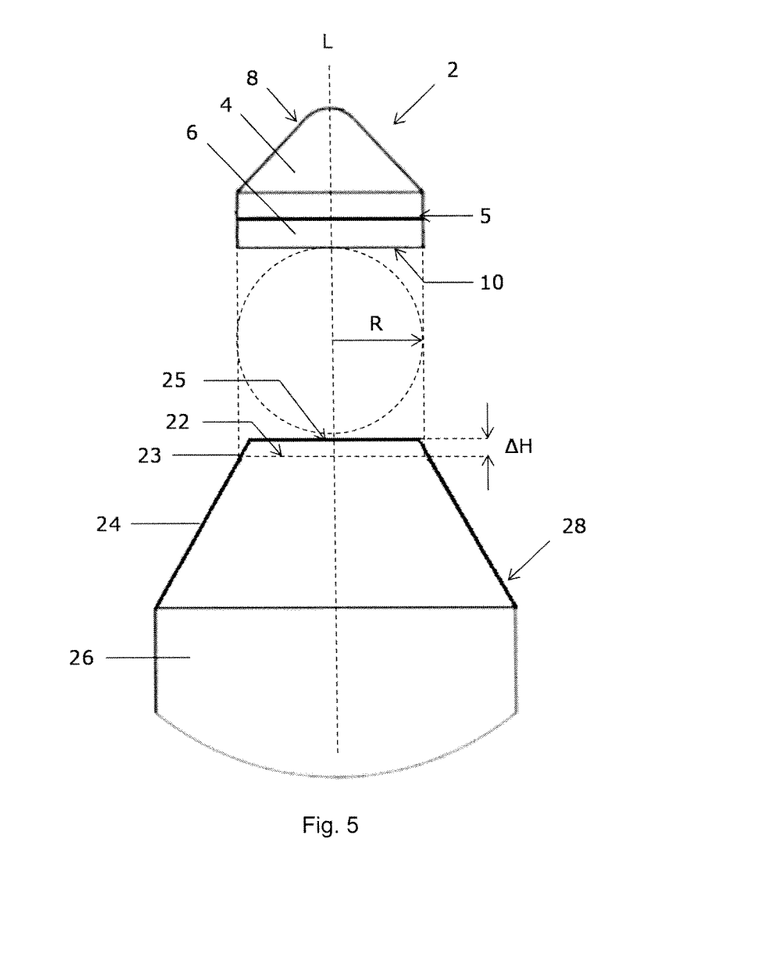
FIG. 5 and FIG. 6 show schematic side views of example strike tips spaced apart from respective example precursor bodies for a support tool.

With reference to FIG. 5, a support body (not shown in this drawing) may be provided by providing a precursor body 28 having substantially the same shape and dimensions as the support body, except that the frusto-conical volume 24 is longer.

Therefore, a proximate end 25 of the precursor body 28 has a smaller area than that of the support body and is spaced further apart from the cylindrical portion 26. In this particular example method, the centres of the attachment ends of both the strike tip 2 and the precursor body 28 (and subsequently the support body) will be concentric when joined, both lying on a longitudinal axis L. The precursor body 28 at the proximate end 25 may be ground down by a distance ΔH to increase the proximate end area 25 to that desired for the attachment end 22 of the support body, which is substantially equal to that of the area of the attachment end 10 of the strike tip 2 in this particular example, thus providing the support body. In this example, the attachment ends 10, 22 of the strike tip 2 and the support body are both substantially circular, both having radius R. The edge 23 of what will be the attachment end 22 of the support body 20 may be relatively sharp, being defined by the intersection between the attachment end 22 and the adjacent side surface of the frusto-conical volume 24. It may not be possible to characterise the edge 23 in terms of the radius of an osculating circle if the edge is too sharp.

The strike tip 2 may be joined to the attachment end 22 of the resulting support body by means of braze alloy material, in a process that involves placing braze alloy material between the opposite attachment ends 10, 22 such that the braze alloy material contacting each of the opposite attachment ends 10, 22, and heating the braze alloy material to melt it and wet both attachment ends 10, 22. It will likely be necessary to heat the braze alloy (and consequently volumes of the substrate 6 and support bodies adjacent the respective attachment ends 10, 22) to a temperature of several hundred degrees Celsius. On cooling to ambient temperature, the braze alloy material will solidify and bond the attachment ends 10, 22 together.

Figure 6:
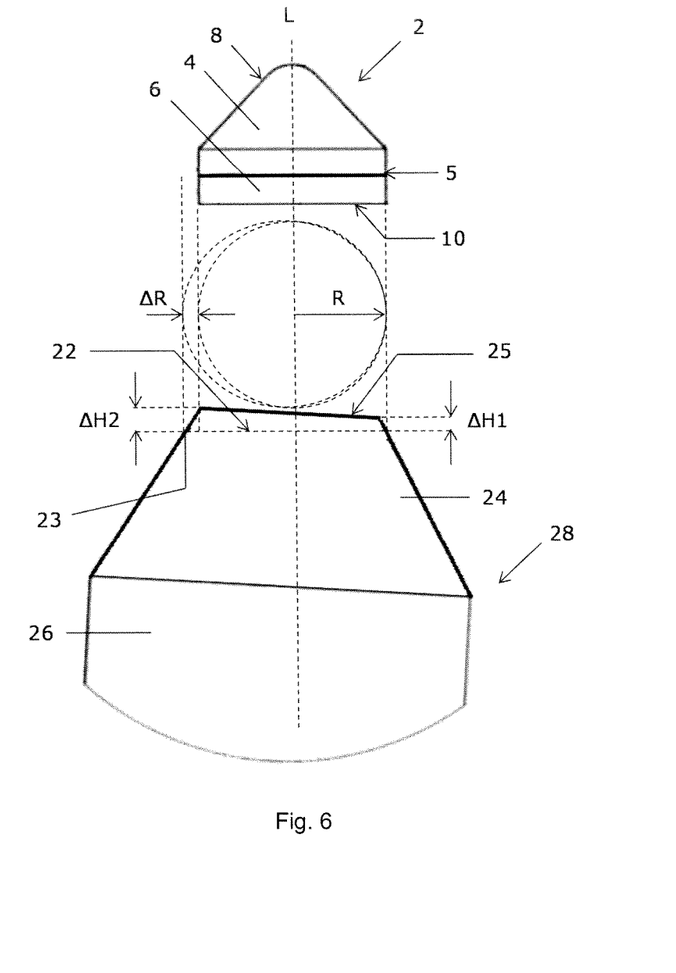

With reference to FIG. 6, the shape of the precursor body 28 may be slightly distorted as provided. For example, the precursor body 28 may comprise an elongate portion 26 that may be slightly bent such that the proximate end 25 is not substantially perpendicular to a cylindrical axis defined by the side of the elongate portion 26 and or of the end portion 24. The volume of cemented carbide material to be removed adjacent the proximate end 25 to provide the attachment end 22 of the support body, the area of which is sufficiently large to accommodate the attachment end 10 of the strike tip 2, may not have uniform thickness. The thickness of the volume of the end portion 24 to be removed may be ΔH1 on one side of the proximate end 25 and ΔH2 on the antipodal side. This will result in an elliptical attachment area 22, the transverse diameter of which will be a greater than the radius of the attachment end 10 of the strike tip 2 by a margin ΔR. When the attachment ends 10, 22 of the strike tip 2 and support body are joined, an edge 23 of the support body will be exposed (as well as an area of the attachment end 22 of the support body). The edge 23 will likely be a relatively abrupt transition between the attachment end 22 of the support body and a side area of the support body adjacent the attachment end 22. As used herein, the edge 23 may be described as non-arcuate.

A relatively abrupt, non-arcuate edge present on the strike construction in the vicinity of the strike tip may result in elevated internal stress in the strike tip and or the support body, which may increase the risk of cracking and fracture in use. In examples where the strike tip is joined to the support body by means of braze alloy material, the process of heating and subsequently cooling the strike tip and an end portion of the support body may result in increased stress near the edge or other relatively sharp, abrupt or discontinuous feature potentially present on the surface of the strike construction. Since use of the strike construction will likely involve repeatedly striking the strike tip against a hard body or formation, the risk of crack formation in the strike tip and or the support body will likely be relatively higher if internal tensile stress is relatively high. Therefore, it may generally be desired that edges that may be present are acuate (as used herein) and capable of being characterised by the radius of an osculating circle of at least 0.01 mm. Processing the strike construction to avoid or reduce the occurrence of non-arcuate edges or other sharp or abrupt surface features will likely have the aspect of reducing the presence and or magnitude of tensile internal stress in the vicinity of the attachment ends, thus reducing the risk of cracking or fracture in use or during subsequent manufacture steps.

Other potential sources of elevated stress within the strike tip and or the support body may include extraneous material that has become bonded to a side surface area of the strike tip and or the support body. For example, joiner material, such as braze alloy, or residual material from sintering the strike tip may have become attached to a side surface. Residual material may include refractory metal such as molybdenum, tantalum or niobium in elemental and or compound form, such as oxide and or carbide compound form, or ceramic material such as magnesium oxide. This may occur when polycrystalline super-hard material such as PCD or PCBN material is sintered within a capsule comprising refractory metal material or ceramic material. Although most of the residual material will likely have been removed prior to joining the strike tip and the support body, some may still remain attached to the side of the strike tip and it may be desirable to remove it, as well as any braze material that may be attached.

In some examples, a strike construction may be processed by means of abrasive jet machining (AJM), which may be used to round non-arcuate edges and convert them to arcuate edges. It may also be used to remove some or substantially all residual or joiner material attached to the side of the strike tip and or the support body. Therefore, processing the strike construction using AJM as disclosed may have the aspect of reducing internal stress and potentially extending the working life of the strike construction.

Figure 7:
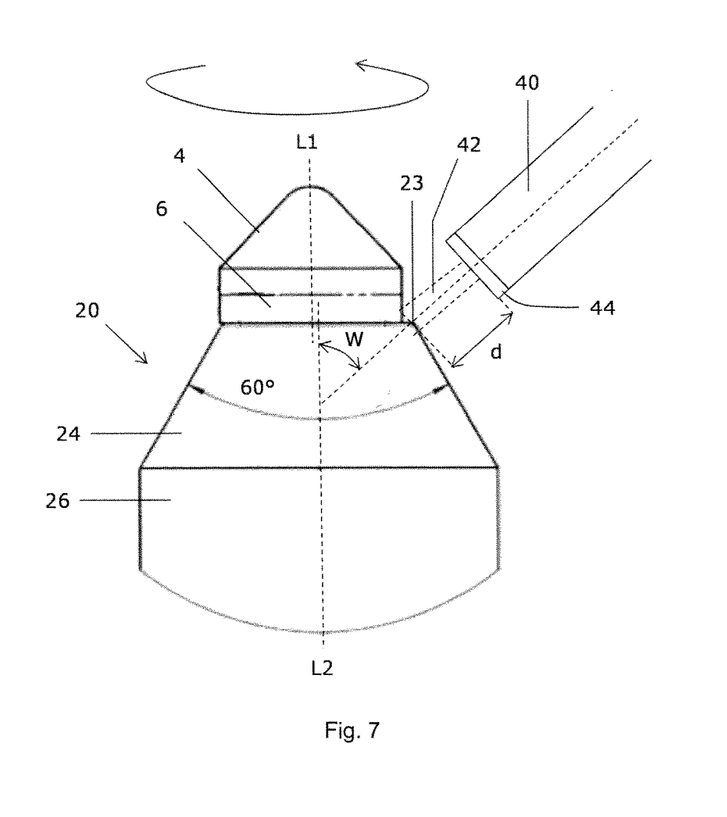
FIG. 7 shows part of an example strike construction being subjected to abrasive jet machining.

With reference to FIG. 7, an example method of processing a strike construction may include rotating a region of it in the vicinity of the join through a flux of abrasive grains transported in and energised by a jet 42 of fluid. The relative orientation of the abrasive jet 42 and the strike construction may be such that the abrasive grains are directed at a region of the strike construction that includes the edges of the attachment ends of the strike tip and the support body 20, throughout a full rotation of the strike construction about a longitudinal axis L1. In particular, the abrasive jet 42 the region subjected to AJM may include exposed edges 23 of the support body 20 and or the strike tip. The abrasive grains may consist of SiC and the parameters of the AJM process may be selected such that cemented material can be removed from edge 23 of the support body and or the substrate 6 of the strike tip.

An AJM apparatus may be substantially self-contained and may implement a process of compressing the fluid, allowing the pressurised fluid to pass through a convergent-divergent nozzle into a mixing chamber, in which abrasive grains will be combined with the fluid prior to the mixture being allowed to escape the mixing chamber through a convergent nozzle. The nozzles will likely comprise material such as tungsten carbide or synthetic sapphire, which is relatively resistant to abrasion by the abrasive grains. In use, the distance between the nozzle and the work-piece will likely affect the magnitude of the machined area and the rate of material removal.

In one particular example, the abrasive jet 42 may be disposed at an incident angle W of about 85 degrees with respect to the side of the strike tip substrate 6 (in a longitudinal plane), the flux of abrasive grains being collimated by means of a nozzle 44 comprising an outlet having a diameter of about 10 millimeters (mm) and energised by a jet of air that had been pressurised to about 600 kilopascals (kPa). A jet comprising silicon carbide grains having a mean size of about 50 microns to about 500 microns may be applied for a time period of about 3 minutes, in one particular example. The incident grains may be applied at a rate of about 80 grams per minute (g/min) and the strike construction may be rotated about the longitudinal axis L1 at a rate of about 3.5 revolutions per minute (r.p.m.) during the AJM process.

Figure 8:
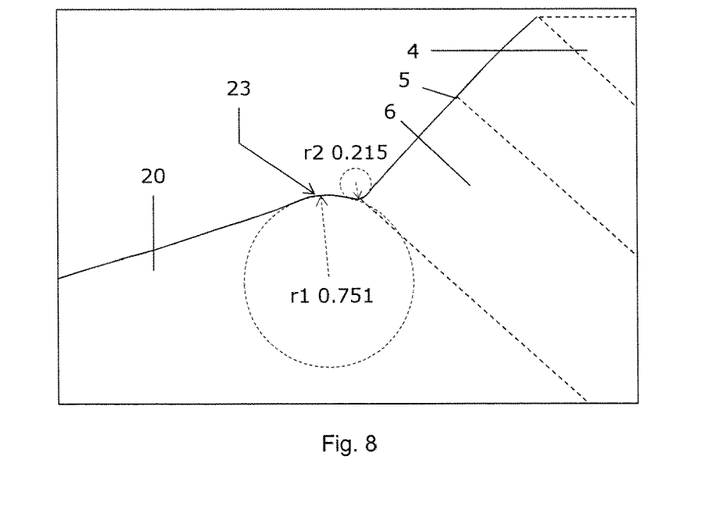
FIG. 8 and FIG. 9 schematically illustrate respective magnified views of longitudinal cross sections through example strike constructions in the vicinity of the joined attachment ends of the respective strike tips and support bodies.
Figure 9:
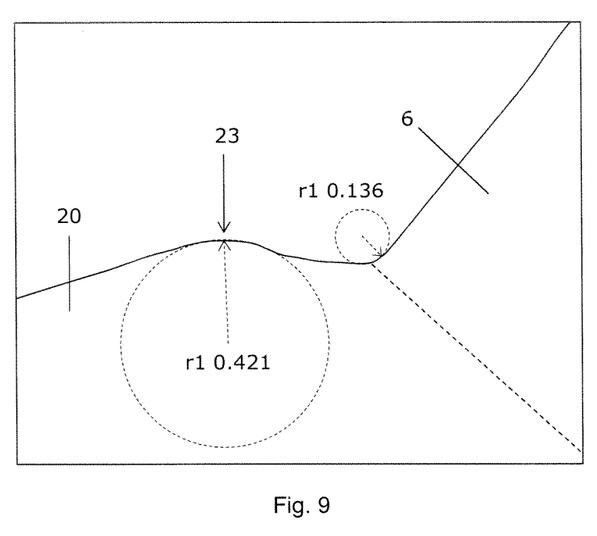

In the example strike constructions partly illustrated in FIG. 8 and FIG. 9, respective cemented carbide substrates 6 of strike tips are joined to respective attachment ends of support bodies 20. In some examples, the strike tip may comprise PCD material 4 joined at an interface boundary 5 to the substrate 6. Exposed arcuate edges 23 of the support bodies 20 are evident, each providing an arcuate connection between a side area and an attachment end of the support body 20. In both examples illustrated, an osculating circle can be drawn for each of the convex arcuate edges 23, as well as for the concave, fillet-like transition between the sides of the substrate 6 and support body 20. In the example shown in FIG. 8, the radii r of the osculating circles of the convex arcuate edge 23 and the concave transition area are about 0.75 mm and about 0.21 mm, respectively. In the example shown in FIG. 9, the radii r of the osculating circles of the convex arcuate edge 23 and the concave transition area are about 0.42 mm and about 0.13 mm, respectively.

In some examples, abrasive jet machining may have an effect of increasing the surface roughness of the cemented carbide substrate and or the support body. In three examples, the arithmetic mean surface roughness ($R_a$) of the support body was increased to 1.78 microns, 1.81 microns and 1.12 microns, respectively.

In some examples, the support body may comprise or consist of cemented carbide tungsten carbide (WC) material, in which the grains of WC may have a mean size of about 1.5 microns to 2.5 microns and the content of cobalt-based binder material may be about 6 weight percent, the cemented carbide material having thermal expansion coefficient (CTE) of about 5.1 to $5.4 \times 10^{-6}$ (5.1 to 5.4 times ten to the power of minus six) per Kelvin (/K). The support body may comprise a cylindrical shaft that is shrink fitted in the bore of a steel holder body by a process including heating part of the holder surrounding the bore to a temperature of about 350 degrees Celsius to expand the bore, inserting the shaft of the support body into the heated bore and then allowing the latter to cool and shrink against the shaft and thus hold it in compression. The interference between the shaft of the support body and the bore may be about 0.02 mm to 0.03 mm. The support body may be released for re-use by re-heating the bore and removing the shaft.

In some examples, the strike tip will comprise a strike structure consisting of polycrystalline diamond (PCD) material joined at a non-planar interface boundary to a substrate comprising cobalt-cemented tungsten carbide. A strike end of the strike tip coterminous with the PCD material may be convex and include a central apex, having the general shape of a spherically blunted cone with a cone angle in the range from 86 degrees to 92 degrees. In use, the strike end will likely be driven to strike a body or formation to be broken up. The thickness of the substrate at a side of the strike tip may be about 3.5 mm from the attachment end to the interface boundary with the PCD material (at the side). The thickness of the PCD material from the apex to the opposite interface boundary may be about 4 mm and the thickness of the substrate from the interface boundary opposite the apex to its attachment end may be about 5 mm. The apex may have the shape of part of a spherical surface having a radius of about 2 mm to about 6 mm.

The substrate may comprise or consist of cemented carbide material comprising tungsten carbide (WC) grains having mean size of about 3 to 4 microns. Prior to the step of sintering the PCD material onto the substrate, the cemented carbide may comprise about 8 weight percent cobalt binder, some of which may be lost to the PCD material by infiltration during the sintering process. Therefore, the content of cobalt in the substrate of the strike tip will likely be less than 8 weight percent, potentially about 6.5 weight percent. In some examples, the coefficient of thermal expansion (CTE) of the substrate may be about $5.3 \times 10^{-6}$ (5.3 times ten to the power of minus six) per Kelvin (/K). The diameter of the substrate may be about 12 mm.

When examples of the method are used, it may not be necessary to provide the precursor or support body such that the edge or edges of the proximate or attachment end, respectively, are arcuate (rounded). Since the attachment end will be provided by removing material from an end portion of the precursor body adjacent the proximate end, the condition of the edges will be relatively less critical because it can be modified at a later stage in the manufacture process. In some example methods, the material of the end portion may be removed by grinding or cutting, leaving an attachment end having relatively sharp, abrupt edges (in other words, non-arcuate edges, as used herein). Such edges may be sufficiently rounded and made arcuate by applying an abrasive jet to them.

Example methods may have the aspect of reducing the need to reject precursor bodies that are slightly bent or misshapen in other ways, since the attachment end may be modified as necessary by removing material from the end portion. This will permit the attachment end to be made sufficiently planar and correctly oriented, although it may be elliptical in shape rather than circular, in some examples, or more elliptical than desired, in other examples. Consequently, an edge of the attachment end of the support body will likely be exposed (as will be an area of the attachment end) and may be rounded to provide arcuate edges.

In some example methods, it may not be necessary to reduce the diameter of strike tips that are too large, since the attachment end of the support body can be prepared accordingly. In examples where the strike tip comprises super-hard material, this will likely increase substantially the efficiency (and decrease the cost) of the making the strike construction, since it is relatively time-consuming and costly to remove super-hard material from a body by cutting or grinding, for example.

Example methods may have the aspect of reducing the cost of finish-processing the strike construction, since using abrasive jet machining to round edges may be faster and or less costly than certain other methods, such as grinding. Abrasive jet machining using hard ceramic grains such as SiC appears to be capable of removing residual material attached to the side of the strike tip and rounding edges of the cemented carbide components in a single step. Other potential abrasive grain materials such as glass (silicon dioxide) or oven slag appear not to be capable of achieving this as efficiently, or at all. Abrasive jet machining by means of SiC grains will also likely achieve concave fillet-like rounding where the substrate and support body meet are joined.

In general, examples of the disclosed method are likely to increase the efficiency and decrease the cost with which batches of strike tips can be manufactured. This may be due in part to reduced rejection of slightly misshapen or too large precursor bodies and or strike tips. It may also be due in part to avoiding or reducing the need to process super-hard material, and or in part due to the relatively high efficiency and adaptability of abrasive jet processing. It has been appreciated that AJM can be used to process cemented carbide constructions to within final edge and surface tolerances on a commercial scale and efficiency.

Various terms and concepts as used herein are briefly explained below.

As used herein, an osculating circle is one that can be drawn through a given point on a smooth curved surface, passing through the point and a pair of additional points on the curved surface. An arcuate edge between adjacent surface areas of a body may be characterised with reference to the radius of an osculating circle passing through points on the surface, in which an arc of the osculating circle best matches an arc defined by the edge, extending from one of the adjacent areas to the other. Some edges are non-arcuate, as used herein, and cannot be characterised by an osculating circle having a radius of at least 0.01 mm.

In general, various parameters may be used for characterising the roughness of surfaces, based on amplitude parameters derived from measured deviations of the surface normal to the mean plane defined by it. In particular, the arithmetic mean roughness $R_a$ is used herein.

Synthetic and natural diamond, polycrystalline diamond (PCD), cubic boron nitride (cBN) and polycrystalline cBN (PCBN) material are examples of super-hard materials. As used herein, synthetic diamond, which is also called man-made diamond, is diamond material that has been manufactured. As used herein, polycrystalline diamond (PCD) material comprises an aggregation of a plurality of diamond grains, a substantial portion of which are directly inter-bonded with each other and in which the content of diamond is at least about 80 volume percent of the material. Interstices between the diamond grains may be at least partly filled with a filler material that may comprise catalyst material for synthetic diamond, or they may be substantially empty. As used herein, a catalyst material (which may also be referred to a solvent/catalyst material) for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains.

As used herein, PCBN material comprises grains of cubic boron nitride (cBN) dispersed within a matrix comprising metal or ceramic material.

Other examples of super-hard materials include certain composite materials comprising diamond or cBN grains held together by a matrix comprising ceramic material, such as silicon carbide (SiC), or cemented carbide material, such as Co-bonded WC material.

As used herein, a shrink fit is a kind of interference fit between components achieved by a relative size change in at least one of the components (the shape may also change somewhat). This is usually achieved by heating or cooling one component before assembly and allowing it to return to the ambient temperature after assembly. Shrink-fitting is understood to be contrasted with press-fitting, in which a component is forced into a bore or recess within another component, which may involve generating substantial frictional stress between the components.

As used herein, abrasive jet machining (AJM) is a process in which abrasive grains are propelled by a sufficiently high velocity fluid to erode material from a work-piece. In general, abrasive grains having a mean diameter of at least about 25 microns (as measured by dynamic light scattering, for example) may be carried at speeds of up to about 300 meters per second (m/s) by a fluid jet.

The invention claimed is:

1. A method of making a strike construction for a pick tool, the strike construction comprising:
    a strike tip and
    a support body, in which
    respective attachment ends of each of the strike tip and support body are joined to each other,
    the attachment end of the strike tip is coterminous with cemented carbide material comprised in the strike tip, and
    the attachment end of the support body is coterminous with cemented carbide material comprised in an end portion of the support body, the end portion being configured such that sides of the support body depend divergently from its attachment end;
    the method including:
    providing the strike tip and a precursor body for the support body, in which a proximate end of the precursor body is coterminous with cemented carbide material comprised in an end portion of the precursor body, the end portion of the precursor body being configured such that sides of the precursor body depend divergently from its proximate end, the area of which is less than the area of the attachment end of the support body;
    processing the end portion of the precursor body to increase the area of the proximate end to that of the attachment end of the support body; and
    joining the respective attachment ends of the strike tip and the support body to provide the strike construction;
    wherein the strike construction includes an exposed edge defined by an intersection of the attachment end of the support body and a side area adjacent the attachment end of the strike tip, and the method includes processing the exposed edge to form an arcuate edge area in which the arcuate edge area defines an osculating circle having a radius of at least 0.01 millimeters.

2. A method as claimed in claim 1, including processing a region of the strike construction adjacent at least one of the attachment ends to modify a characteristic of at least part of the region.

3. A method as claimed in claim 1, in which the strike tip comprises super-hard material coterminous with a strike end, opposite its attachment end.

4. A method as claimed in claim 1, in which the attachment end of the support body is substantially elliptical.

5. A method as claimed in claim 1, including processing the strike construction using abrasive jet machining with abrasive grains having a Knoop hardness of at least 2,200.

6. A method as claimed in claim 5, in which the abrasive grains have a mean size of 50 to 500 microns.

7. A method as claimed in claim 5, in which the abrasive grains impact the strike construction at a rate of at least 50 grams per minute (g/min).

8. A method as claimed in claim 5, including removing 0.1 to 5 grams (g) of cemented carbide material from the strike construction by the abrasive jet machining.

9. A method as claimed in claim 5, in which a cemented carbide side area adjacent at least one of the attachment ends has an arithmetic mean surface roughness ($R_a$) of 1.00 to 3.00 microns after the abrasive jet machining.

10. A method as claimed in claim 5, in which the abrasive grains comprise silicon carbide.

11. A method as claimed in claim 5, comprising joining the strike tip and support body by means of joiner material and removing the joiner material from a side of the strike construction using the abrasive jet machining.

12. A method as claimed in claim 5, including controlling the direction of the abrasive jet machining in relation to the orientation of the strike construction by an automated control mechanism, responsive to receiving optical information about a condition of the strike construction.

13. A strike construction for a pick tool, comprising:
   a strike tip and
   a support body, wherein:
      the strike tip is non-rotatable relative to the support body;
      respective attachment ends of each of the strike tip and support body are joined to each other;
      the attachment end of the strike tip is coterminous with cemented carbide material comprised in the strike tip;
      the attachment end of the support body is coterminous with cemented carbide material comprised in an end portion of the support body, the end portion being configured such that sides of the support body depend divergently from its attachment end;
      the strike tip comprises polycrystalline diamond (PCD) material coterminous with a strike end including an apex opposite the attachment end of the strike tip;
      the strike tip and support body are substantially non-concentric, wherein the strike construction includes an exposed edge defined by an intersection of the attachment end of the support body and a side area adjacent the attachment end of the strike tip; and
      an arcuate edge area is formed from the exposed edge in which the arcuate edge area defines an osculating circle having a radius of at least 0.01 millimeters.

14. A strike construction as claimed in claim 13, in which the attachment end of the support body is substantially elliptical.

15. A strike construction as claimed in claim 13, in which a cemented carbide side area of the strike construction has an arithmetic mean surface roughness of 1.00 to 3.00 microns adjacent an attachment end of the support body.

16. A strike construction as claimed in claim 13, in which an area of at least one of the attachment ends is exposed.

17. A pick tool comprising a strike construction as claimed in claim 13, and a steel holder comprising a shank for attachment to a drive mechanism, in which the strike construction is coupled to the holder; and in which the support body and the holder are cooperatively configured such that the support body can be non-moveably coupled with the holder.

* * * * *